I. KITSEE.
WELL BORING APPARATUS.
APPLICATION FILED AUG. 25, 1908. RENEWED AUG. 22, 1913.
1,090,919.
Patented Mar. 24, 1914.
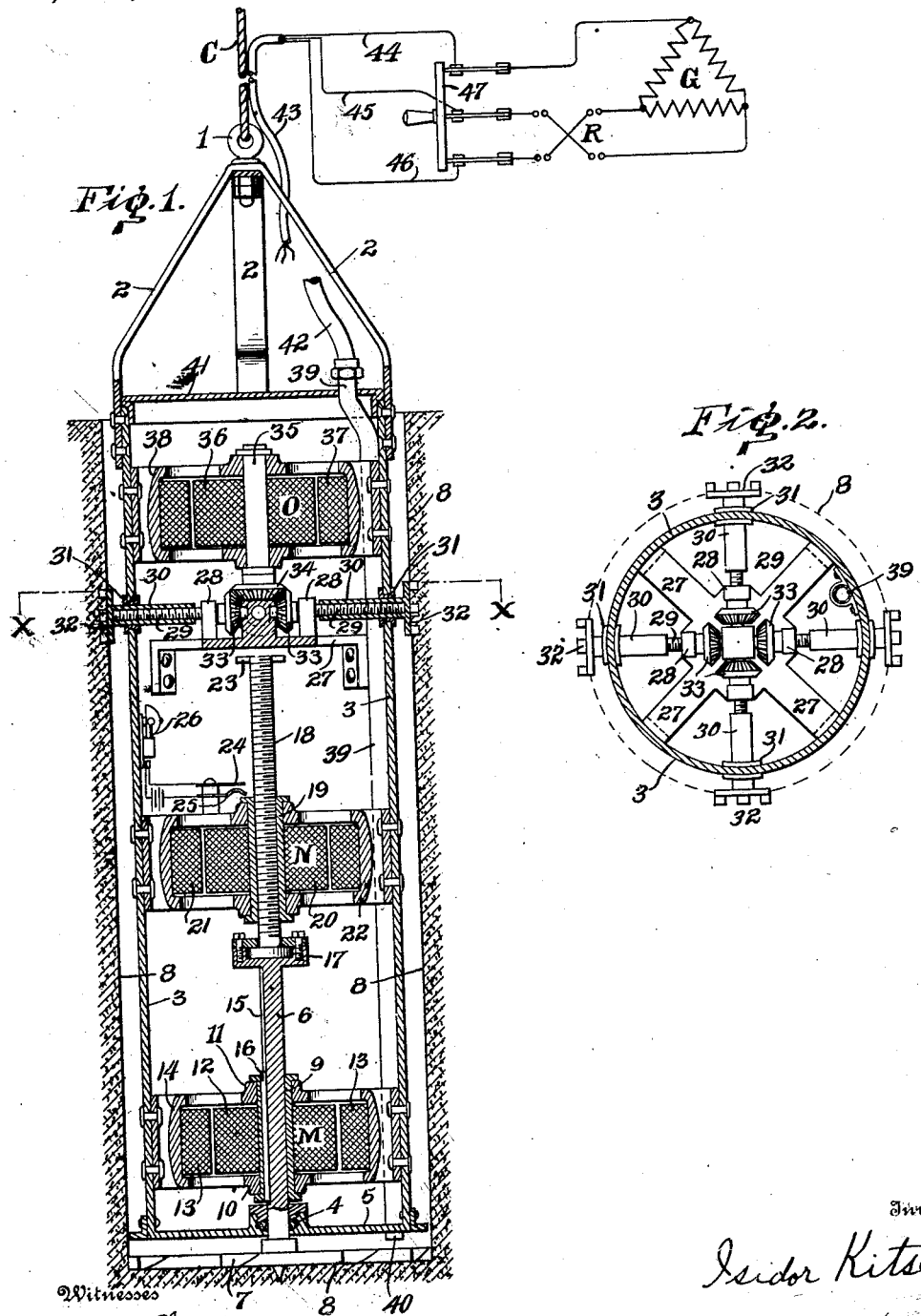

UNITED STATES PATENT OFFICE.

ISIDOR KITSEE, OF PHILADELPHIA, PENNSYLVANIA.

WELL-BORING APPARATUS.

1,090,919.  Specification of Letters Patent.  Patented Mar. 24, 1914.

Application filed August 25, 1908, Serial No. 450,126. Renewed August 22, 1913. Serial No. 786,181.

*To all whom it may concern:*

Be it known that I, ISIDOR KITSEE, a citizen of the United States, residing in the city of Philadelphia, county of Philadelphia, and State of Pennsylvania, have invented a new and useful Well-Boring Apparatus, of which the following is a specification.

My invention relates to well digging or boring apparatus, and more particularly to apparatus for the sinking of deep wells, such as oil, water, or gas wells, and especially wells of this nature of considerable diameter.

It is the object of my invention to provide apparatus for the purposes above mentioned and to this end, comprises a casing, cage, carrier or container carrying the earth or rock cutting instrument driven, fed, or advanced by electric motors, in addition to means, such as an electric motor, for clamping or holding the casing or carrier in position during the earth or rock cutting process.

My invention resides in other features hereinafter pointed out and claimed.

For an illustration of one of the forms my invention may take, reference is to be had to the accompanying drawing, in which:

Figure 1 is a vertical sectional view through the casing or cage, some parts being shown in elevation. Fig. 2 is a horizontal section, some parts in elevation, on the line X—X, Fig. 1, through the earth and the casing showing the casing or cage clamping means.

A cable C supported and controlled by hoisting apparatus upon a derrick upon the surface of the earth supports at its lower end, by means of the eye bolt 1 and the attached arms 2, a casing, cage, container or carrier 3 formed, preferably, of sheet metal and cylindrical in form. Through a stuffing box 4 in the lower end wall 5 of the casing 3 extends a shaft 6, carrying at its lower end the rock or earth cutting instrument 7 whose diameter determines the diameter of the hole or well bored through the earth or rock 8 within a hole or well in which the casing 3 is shown. The shaft 6 passes through the sleeve 9 having bearings at 10 and 11. Upon the sleeve 9 is mounted the rotor or armature 12 of an electric motor whose field or stator is shown at 13 supported by the ring 14 which is, in turn, secured upon the inner walls of the casing or cage 3. In the shaft 6 is a long key way 15 in which engages the key 16 carried by the sleeve 9. Thus, as the member 12 of the motor rotates it will rotate the cutting instrument 7 and still allow the shaft 6 to be fed longitudinally with respect to the driving member 12. The motor M, having rotor 12 and stator 13 for driving the cutting instrument 7, may be of any suitable type such as a series, shunt, or compound wound direct current motor or an alternating current motor, and if such, is preferably an induction motor, which, as well understood in the art, requires electrical connections to the stator or field windings only, the rotor being preferably a short circuited winding. The rotor winding may in this case have considerable resistance to secure large torque at starting and large torque at speeds below synchronism.

The upper end of the shaft 6 terminates in a coupling 17, by means of which it is coupled to the shaft 18, the shaft 6 rotating with respect to the shaft 18 at such coupling 17. The shaft 18 is screw threaded and engages within the similarly screw threaded sleeve 19, upon which is mounted the rotor 20, of the second electric motor N, the field or stator 21 being carried by the ring 22, which is also secured upon the inner walls of the casing 3. The motor N may be of the same type as the motor M or may be of a different type. It may be an alternating current induction motor, and in such case, the winding of the rotor 20 is preferably of high resistance because such rotor is practically at standstill a great part of the time and at such standstill should exert great torque and not throw a heavy load upon the supply circuit. The torque exerted by the rotor 20 very slowly rotates the sleeve 19 forcing the shaft 18, and consequently the shaft 6 downwardly, thus feeding the cutting instrument 7 forward as the earth or rock is cut away. The shaft 18 carries at its upper end a lug or projection 23 which, when the shaft 6 has been fed downwardly to the limit, forces the two contacts 24 and 25 together closing the circuit of an electric bell 26. While this bell is here shown as mounted within the casing 3, it is to be understood that it may be at the surface of the earth at the derrick, and in either case its ringing will advise the operator that the cutting instrument 7 has advanced to its limit.

Above the shaft 18 and secured to the inner walls of the casing 3, is a bracket 27 carrying the four bearings 28 for the four screw threaded shafts 29. Embracing each screw threaded shaft 29 is a similarly internally screw threaded sleeve or hollow shaft 30 extending through a stuffing box or bearing 31 in the wall of the casing 3 and carrying at its outer end a suitably pronged member 32 to engage or sink into the walls of the well 8. On the inner end of each shaft 29 is a beveled gear 33, the four beveled gears 33 meshing with the gear 34 carried by the vertical shaft 35 of the motor O whose rotor 36 is secured upon the shaft 35 and whose stator 37 is carried by the ring 38 secured to the inner walls of the casing 3. The rotation of the rotor 36 in one direction feeds the pronged members 32 outwardly, and rotation in the other direction draws them inwardly toward the casing 3. The standstill torque of the motor thus holds the cage 3 clamped in position.

Extending near the wall on the inside of the casing 3 is a pipe 39 which passes through the lower casing end 5 and terminates at 40. The pipe 39 passes upwardly and out through the upper casing head 41 and terminates in a connection for a hose 42, which extends upwardly to the surface of the earth and is connected to any suitable pump for pumping out the mud or products of drilling or boring through the orifice 40. Extending down the well is also a cable 43 composed of electrical conductors supplying current to the several motors, here shown as induction motors, and for the alarm circuits, motor controls, etc. The cable may comprise, among other conductors, the three conductors 44, 45 and 46 leading to a three phase generator G upon the surface of the earth, a reversing switch R being shown in two of the conductors.

By the simple arrangement of conductors shown, by the operation of the reversal switch R at the surface of the earth, all three motors may be reversed at will. If desired, however, additional conductors may be run in the cable 43 to the several motors, and the several motors controlled independently of each other.

The operation is as follows: A preliminary well of suitable diameter may be dug to any suitable depth by any suitable means or process and then the casing 3, with its associated motors, cutting instrument, etc., is lowered into the preliminary well. When the current is turned on the motor O will force the pronged members 32 outwardly, thus engaging the walls of the well and holding the casing 3 firmly in position. The motor M will also rotate the cutting instrument 7, and as the cutting progresses, the motor N will feed the instrument downwardly. When the instrument 7 has advanced to the limit of travel of the shaft 6, the member 23 on the shaft 18 closes the circuit at 24 and 25 and gives an alarm to the operator on the surface of the earth. The operator immediately breaks the circuit of the conductors 44, 45 and 46 by switch 47, thus stopping the motor M and preventing the motor N from feeding any further, and robbing the motor O also of current so that its torque (secured as in the case of motor N) becomes zero. By again closing switch 47 and throwing the reversing switch R to the other position, the operator reverses all the motors. The motor N being reversed lifts the cutting instrument 7 back to the position shown in Fig. 1, with respect to the casing 3 and motor O is also reversed and draws the pronged members 32 inwardly toward the casing. The motor M may run in reverse direction during this time and thus rotate the cutting instrument 7 in reverse direction. But this is immaterial. The operator then stops the motors and lowers the cable C until the cutting instrument 7 again rests on the bottom of the well. Then, by again operating the reversing switch R in opposite direction, all the motors are energized, the motor O forcing the pronged members 32 outwardly to engage in the walls of the well to again hold the casing 3 in rigid position. The rotor of the motor O is of high resistance and thus withstands standing still but while standing still exerts a torque holding the members 32 against or in the walls of the well. The motor M has also been reversed and now drives the cutting instrument 7 in proper direction to cut the earth or rock, and the motor N is now also reversed and feeds the shaft 6 downwardly. As above stated, the motors may be separately controlled by simply running more conductors in the cable 43.

What I claim is:

1. In well boring apparatus, the combination with a casing, of a cutting instrument carried thereby, a motor carried by said casing for driving said cutting instrument, electrically controlled means for clamping said casing in position, and means for advancing said cutting instrument.

2. In well boring apparatus, the combination with a casing, of a cutting instrument carried thereby, a motor within said casing for driving said cutting instrument, a rotary motor within said casing for advancing said cutting instrument, and means at the mouth of the well for reversing said motors.

3. In well boring apparatus, the combination with a casing, said casing adapted to enter the well bore, of a cutting instrument carried by said casing, a motor within said casing for driving said cutting instrument, a motor within said casing for advancing said cutting instrument, means for clamping said casing in position, a motor within said casing for operating said clamping means, and means for simultaneously reversing all of said motors.

4. In well boring apparatus, the combination with a casing adapted to enter the well bore, of a cutting instrument carried by said casing, a motor within said casing for driving said cutting instrument, means for feeding said cutting instrument, electro-magnetic means within said casing for operating said feeding means, means for clamping said casing in position, and electro-magnetic means within said casing for operating said clamping means.

5. In well boring apparatus, the combination with a casing, of cutting apparatus carried thereby, an electric motor for driving said cutting apparatus, means for feeding said cutting apparatus, an electric motor constantly exerting force upon said feeding means, means for clamping said casing in position, and electro-magnetic means for operating said clamping means.

6. In well boring apparatus, the combination with a casing, of cutting apparatus carried thereby, means for clamping said casing in position, and an electric motor constantly exerting force upon said clamping means.

7. In well boring apparatus, the combination with a casing, of cutting apparatus carried thereby, an electric motor in said casing for driving said cutting apparatus, means for clamping said casing, an electric motor for controlling said clamping means, means for feeding said cutting apparatus, an electric motor for controlling said feeding means, and means for reversing all said motors.

In testimony whereof I have hereunto affixed my signature in the presence of the two subscribing witnesses.

ISIDOR KITSEE.

Witnesses:
DANIEL WEBSTER, Jr.,
ANNA E. STEINROCK.